July 5, 1955 R. E. STANTON 2,712,343
HEAT SEALING MACHINE
Filed July 14, 1953
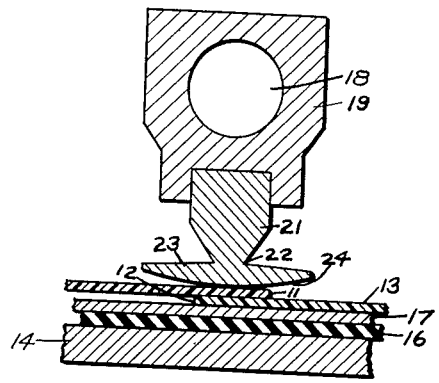
INVENTOR.
Robert E. Stanton
BY
ATTORNEYS.

United States Patent Office 2,712,343
Patented July 5, 1955

2,712,343
HEAT SEALING MACHINE

Robert E. Stanton, Bloomfield, N. J., assignor to Celanese Corporation of America, New York, N. Y., a corporation of Delaware Application July 14, 1953, Serial No. 367,908

1 Claim. (Cl. 154—42)

This invention relates to heat sealing and relates more particularly to an improved apparatus for heat sealing of relatively thin films of thermoplastic material.

The heat sealing of relatively thin films of thermoplastic material to one another presents a number of difficulties. In order to obtain an adequate seal between the films it is necessary to heat the same to an elevated temperature so as to soften the thermoplastic material, and to apply sufficient pressure to the heated films to produce an autogenous bond therebetween. It is often difficult to control the sealing pressure and the amount of heat supplied so as to produce a secure bond between the films without unduly reducing the thickness of the sealed portion. When the sealed portion is pressed too thin during the sealing operation the strength of said sealed portion is greatly reduced.

The aforementioned difficulty is particularly pronounced when the heat sealing of cellulose acetate films is carried out on high speed bag-making machines. In such machines the film is drawn forward, through a system of rolls, and formed into a sleeve, having overlapping edges, on a forming plate. The forward progress of the sleeve is then stopped, the leading end of the sleeve is cut and a sealing iron is pressed downward on the overlapping edges of the sleeve to seal said edges to each other. Generally, the sealing iron is applied to the film for a very short time, e. g. about ¼ second, and it is difficult to obtain a consistently strong flat seal.

It is an object of this invention to provide an apparatus for the heat sealing of relatively thin films to one another which will be free from the foregoing and other disadvantages.

A further object of this invention is the provision of a novel apparatus for the heat sealing of relatively thin films to one another which is efficient in operation and relatively simple in construction.

Other objects of this invention will be apparent from the following detailed description and claims.

A preferred form of this invention is illustrated in the accompanying drawing which shows an elevational view of the heat sealing apparatus in cross-section.

Referring now to the drawing, reference numerals 11 and 12 designate the overlapping edges of a film 13 made of a thermoplastic material such as cellulose acetate. This film is supported on a metal forming plate 14 having a covering of sheet rubber 16 on top of which is a layer of glass cloth 17 coated with polytetrafluoroethylene or with any other suitable material which does not adhere to heated cellulose acetate.

The heat for sealing the overlapping edges of the film 13 is supplied from a suitable core heater 18 to an elongated block 19 which transfers the heat to an elongated sealing iron 21 supported by said block. The upper portion of the sealing iron 21 is relatively wide and is in close contact with the block 19 so that there is good heat transfer between said block and said upper portion. Desirably, there is a suitable thermostat (not shown), at or near the interface of the block 19 and the sealing iron 21, for controlling the heat output of the core heater 18. The intermediate portion of the sealing iron 21 is tapered to a relatively narrow waist 22, while the bottom portion of the sealing iron is broad in cross-section, being in the form of an integral tapered sole plate 23 having a convex lower sealing face 24. The sealing iron of this invention may be of any desired size. In one form of said sealing iron the radius of curvature of the sealing face 24 is about twice the width of the sole plate 23, which width may be, for example, ½ inch or 1 inch; the thickness of the sole plate 23, at its center, is equal to about ⅛ of said width; and the width of the waist 22 is also about equal to about ⅛ of the width of said sole plate. The waist 22 and sole plate 23, as well as the core heater 18, the block 19 and the upper portion of the sealing iron 21, extend the entire length of the desired seal, e. g. about 6 to 15 inches.

It will be readily seen that the heat flowing from the block 19 passes through the waist 22 to the center of the sole plate 23 and then to the tapered side portions of said sole plate. Accordingly, the center of the sealing face 24 will be at a higher temperature than the edges of said face. Desirably, the sealing face is coated with polytetrafluoroethylene or other similar material which does not adhere to heated cellulose acetate.

In operation, the block 19 is moved downward to press the heated sealing face 24 against the upper surface of the film 13. This pressure causes the rubber layer 16 to yield sufficiently so that substantially the entire sealing face 24 is in contact with the film 13. The temperature of the center of the sealing face 24 is sufficient to effect heat sealing of the film, but the temperature adjacent to the outer edges of the said sealing face is below the sealing temperature so that these edges act only to exert pressure on the portions of the film thereunder so as to assist in producing a flat seal.

When the apparatus of this invention is used in a high speed bag making machine, such as previously described, the outer edges of the sealing face 24 may be at a heat sealing temperature initially. However, after a few bags have been produced in the machine these edges will have given off sufficient heat to said bags so that the temperature of said edges is reduced below the sealing temperature, as desired. Thereafter, the apparatus oprates to produce a consistently strong flat seal.

It is to be understood that the foregoing detailed description is given merely by way of illustration and that many variations may be made therein without departing from the spirit of my invention.

Having described my invention, what I desire to secure by Letters Patent is:

In an apparatus for the heat-sealing of thermoplastic films, means having a resilient surface for supporting said films, said means comprising a forming plate, a resilient rubber layer on said forming plate, a layer of glass cloth coated with polytetrafluoroethylene on said rubber layer, said coated glass cloth layer being adapted to receive said films, and a sealing iron for applying heat and pressure to said films, said sealing iron comprising a heat receiving portion and a tapered sole plate having a convex sealing face coated with polytetrafluoroethylene, said heat receiving portion being joined to said sole plate only by an integral tapered portion having a narrow waist adjacent to the center of said sole plate.

References Cited in the file of this patent
UNITED STATES PATENTS

| | | |
|---|---|---|
| 1,932,083 | Nichols et al. | Oct. 24, 1933 |
| 1,997,268 | Scharpf | Apr. 9, 1935 |
| 2,253,946 | Waters | Aug. 26, 1941 |
| 2,343,117 | Vincent | Feb. 29, 1944 |
| 2,624,391 | Lamport | Jan. 6, 1953 |